Dec. 6, 1927.  1,651,596

T. HALL ET AL

METHOD AND MECHANISM FOR TESTING GELATINOUS SUBSTANCES

Filed May 15, 1923

Inventors.
Thomas Hall,
and Robert L. Houtz,
By Butler & Denny
Attorneys.

Patented Dec. 6, 1927.

1,651,596

UNITED STATES PATENT OFFICE.

THOMAS HALL AND ROBERT L. HOUTZ, OF HARRISBURG, PENNSYLVANIA.

METHOD AND MECHANISM FOR TESTING GELATINOUS SUBSTANCES.

Application filed May 15, 1923. Serial No. 639,053.

This invention is designed for testing the strength of gelatinous substances, particularly gelatin, by a determination of the resistance of the surface of the same to depression under pressure, the better grades of gelatin being stronger than the poorer grades in respect to tenacity and resistance to pressure or surface distortion.

In the preferred application of our invention, a quantity of the substance to be tested, of given surface area, is held in a suitable vessel, subjected to the action of a blunt instrument such as a vertically movable weight, the movement of the instrument against the resistance of the substance is indicated upon a scale, and the tenacity and resistance to depression or deflection are determined thereby.

Figure 1:
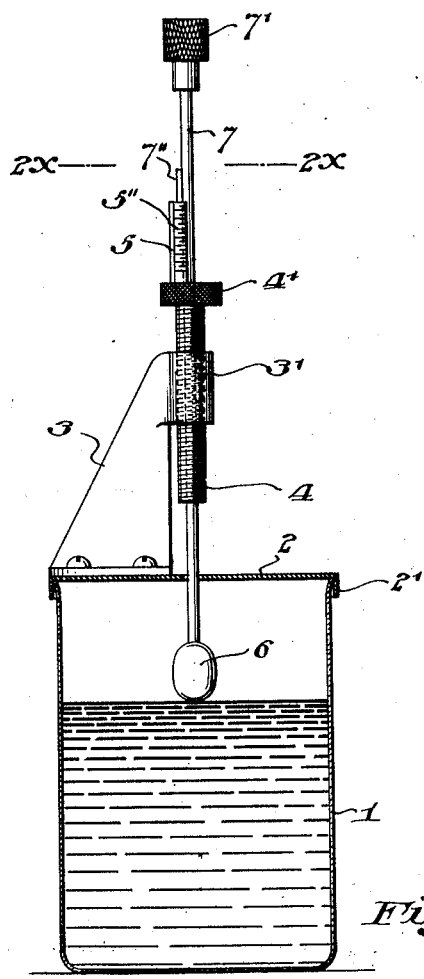
Figure 4:
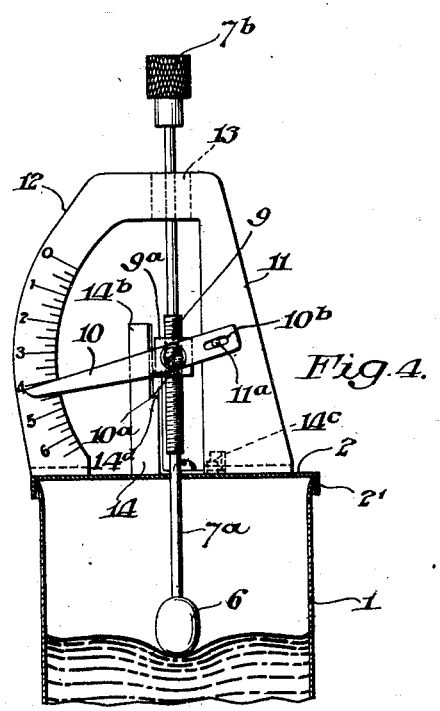
Figure 2:
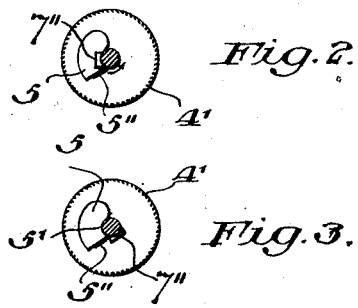
Figure 3:
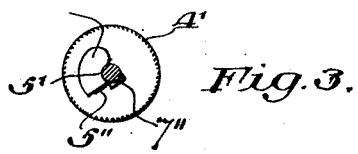

In the accompanying drawings, Fig. 1 is a part sectional side elevation of an instrument adapted for the practice of our invention; Fig. 2 is a sectional view taken on the line 2×—2× of Fig. 1 showing a position with the weight suspended; Fig. 3 is a view similar to that of Fig. 2 showing a position with the weight released; Fig. 4 is a broken part sectional side elevation of a modified construction, and Fig. 5 is a part sectional plan view of the construction shown in Fig. 4.

As illustrated in Figs. 1 to 3 inclusive, a cylindrical vessel 1, preferably of glass, is filled to a desired level, to say three-fourths of its depth, with the gelatin, jelly or other substance that is to be tested. A disc 2, provided with the peripheral flange 2', is placed upon the vessel and provides a base for the standard 3 which supports the interiorly threaded collar 3' centrally with relation to the base. An exteriorly threaded tube or hollow rod 4 is screwed into the collar 3' and is provided with the milled nut 4' at its top by which it can be adjusted vertically. A vertical post 5 is fixed on the nut 4', in offset relation to the tube 4, has a curved vertical surface 5', and is provided with the graduations 5" extending longitudinally thereof. A weight 6, having a spherical bottom as shown, is fixed to the bottom of a rod 7 which passes freely through the parts 2 and 4, is provided at its top with the knob 7' and below the top with a shoulder 7" adapted to be turned into and out of engagement with the top of the post 5. The combined weight of the descending plunger is proportioned in relation to the scale for the specific work to be done.

In testing gelatin, this substance may be mixed with cold water in the ratio of one part of gelatin to thirty-three parts of water and the mixture allowed to stand until the gelatin swells, then put in solution by warming (preferably by water-bath); and then cooled in the vessel to a standard temperature, say 40° F. The part 2 being in place on the vessel 1, the part 4 is adjusted so that the weight 6 will touch the level surface of the substance in the vessel when the combined stop and pointer 7" rests on the top of the post 5, the bottom of the part 7" being at the datum point of the scale 5". This adjustment having been effected, the rod 7 is turned by means of its knurled head 7' so as to disengage the part 7" from the part 5. The weight 6 and the rod 7 now being free will descend against the resistance of the substance in the vessel and the distance of the descent will be indicated by the bottom of the part 7" with relation to the scale 5". This distance will indicate the unit strength of the substance, or tenacity of the gelatin, which if of good quality will resist proportionately to its quality the downward movement of the weight, the weight moving down farther where the gelatin is of poor quality than in one of good quality, indicated by high cohesion.

Figure 5:
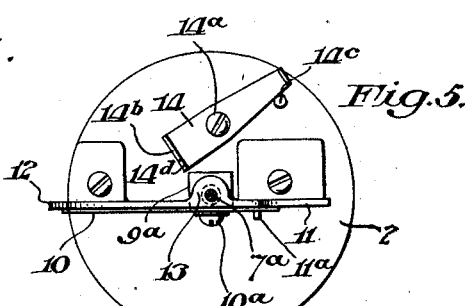

As illustrated in Figs. 4 and 5, the weight 6 is fixed to the bottom of a rod 7ª, which plays centrally through the part 2 on the vessel 1, and is provided with a knurled head 7ᵇ and has a threaded section 9 which is adapted to screw through the stop and bearing 9ª. An upright or standard 11 and a graduated arc 12, integrally connected as shown, are fixed on the part 2 on either side of the rod 7ª which is guided by a bearing or way 13 between the parts 11 and 12. A stud 11ª, fixed in the part 11, engages a slot 10ᵇ in the short arm of the pointer 10, the long arm of which is movable over the scale 12. A lever 14, fulcrumed on the base 2 by the stud 14ª, carries a post 14ᵇ adapted to swing into and out of the line of movement of the part 9ª, which is adapted to rest on the post, the post being limited in its movement away from the part 9ª by the engagement of the lever 14 with a stud 14ᶜ fixed to the top of the part 2.

In this second form of the construction, in testing the substance contained in the vessel 1, the rod 7ᵃ is adjusted relatively to the part 9ᵃ so that when the weight 6 touches the level surface of the substance the pointer 10 will be at zero on the scale 12, the bottom of the part 9ᵃ being engaged on the post. This adjustment may be effected conveniently by lifting the parts 6, 7ᵃ, 9ᵃ and 10 so that the post 14ᵇ can be placed in supporting relation to the part 9ᵃ, and the rod 7ᵃ then screwed through the part 9ᵃ until the weight 6 touches the surface of the substance. Now the post 14ᵇ is disengaged from the part 9ᵃ, the weight 6 falls the distance permitted by the tenacity or cohesive strength of the gelatin and the pointer 10 moves from the zero position on the scale to the position indicating the distance between the bottom of the weight in its two positions, which will indicate the quality of the gelatin. It will be understood that this second form of the device shows on the scale a movement which is a multiple of the actual movement of the weight, for the purpose of facilitating correct measurement.

The post 14ᵇ is provided with a shoulder 14ᵈ which engages the part 9ᵃ when the pointer 10 has reached the bottom of the scale, to prevent such pointer from striking the part 2 and being injured thereby.

Having described our invention, we claim:

1. The method for testing the strength of gelatin and the like substances which comprises applying to the surface thereof a supported member having a weight and area which when the member is otherwise unsupported will depress without penetrating the surface of the said substance, removing the support of said member while the latter is in contact with the normal surface of said substance, and measuring the movement of said member resulting from the pressure thereof.

2. The mechanism for testing the cohesive strength of gelatin and like substances which comprises a container, a reciprocatory instrument adapted for applying a predetermined pressure to the surface of the substance in the container, means for supporting said instrument in contact with said surface without the application of pressure thereto, means for disengaging said supporting means while said instrument is in contact with said surface and means for measuring the movement of said instrument against the cohesive resistance of said substance.

3. The mechanism for testing the strength of gelatin and like substances which comprises a container for the substance to be tested, a device for applying pressure to the surface of the substance in the container, means for measuring the movement of said device against the cohesive resistance of the substance, and means comprising a threaded tube through which said device is movable for adjusting the relation between the pressure device and the measuring means.

4. The mechanism for testing the strength of gelatin and like substances which comprises a container for the substance to be tested, supporting means carried by said container, a device for applying pressure to the surface of the substance in the container having a rod connected therewith and movable through the supporting means, a measuring device comprising a graduated scale, means comprising a screw connecting the rod with the measuring device whereby the pressure device can be adjusted to contact with the surface of the substance when the measuring device is set at the datum position, and means for supporting the measuring device at the datum positioned, said means being movable to permit the operation of the measuring device by the pressure device.

5. The mechanism for testing the strength of gelatin and like substances which comprises a substantially cylindrical container for the substance to be tested, supporting means carried by said container, a device having a convex surface for applying pressure to the surface of the substance in the container having a rod connected therewith and movable freely through the supporting means, measuring means comprising a scale and a fulcrumed indicator, means comprising a screw whereby the rod can be adjusted in said fulcrumed indicator and the device caused to touch the surface of the substance when the indicator is at the datum position with relation to the scale, and detachable means for holding the indicator in adjusted position.

In testimony whereof we have hereunto set our names this 12th day of May, 1923.

THOMAS HALL.
ROBT. L. HOUTZ.